United States Patent Office 3,427,295
Patented Feb. 11, 1969

3,427,295
PENTAERYTHRITOL DERIVATIVES
Samuel F. Reed, Huntsville, Ala., assignor to Rohm & Haas Company, Philadelphia, Pa., a corporation of Delaware
No Drawing. Filed Dec. 10, 1958, Ser. No. 779,503
U.S. Cl. 260—86.1                    11 Claims
Int. Cl. C06b 3/00; C08f 3/38, 15/26

The invention concerns vinyl petrin ether and the process for the manufacture thereof.

"Petrin" is a trivial name commonly used to designate the compound trinitratopentaerythritol

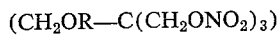
$(CH_2OR-C(CH_2ONO_2)_3)$ and the trivial name is well-known to those skilled in the art. In the interests of simplicity, this trivial name will be used throughout the specification and claims.

Petrin is a high energy compound and has found use as such as a component of combustible and explosive compositions, such as propellants for rockets, missiles, and the like. Particularly in solid propellants, the finished propellant must, in addition to its chemical reactivity, possess certain physical properties. While it is possible to incorporate petrin as such into propellant grains, it apparently does not react with any of the other components of the grain and, in a sense, can be considered as being a "filler." Solid propellant grains generally contain a high proportion of a solid oxidizer such as ammonium perchlorate or ammonium nitrate and these oxidizers further detract from the desired physical properties. Since there are definite minimum physical property specifications which a solid propellant grain must meet, there is a definite limit to the amount of materials which can be added if said materials do not interact to augment the physical properties of the propellant grain. If it were possible to incorporate the petrin molecule into a low molecular weight polymerizable monomer, then such a monomer could, on polymerization, function as a binder for propellant grains, thus incorporating the petrin moiety into the grain by chemical reaction which actually augments the physical properties of the grain.

An object of this invention is to make available a polymerizable monomer containing the petrin moiety.

Another object of this invention is to make available a polymerizable high energy monomer which can be used as the binder for propellant grains.

Another object of this invention is to make available a high energy polymerizable monomer which can be used as a comonomer with other polymerizable monomers to produce propellant grains with superior physical properties.

Employing the process of the present invention, vinyl petrin ether is prepared by a transetherification reaction between an alkyl vinyl ether or a haloalkyl vinyl ether and petrin, using mercuric acetate as the transetherification catalyst. Sodium acetate is used as a buffering agent to control acidity in order to increase the yields of vinyl petrin ether.

Suitable alkyl and haloalkylpropyl vinyl ethers include ethyl vinyl ether, butyl vinyl ether, isobutyl vinyl ether, 2-ethylhexyl vinyl ether, 2-bromoethyl vinyl ether and 2-chloroethyl vinyl ether. 3-chloropropyl and 4-chlorobutyl vinyl ethers may also be used. The preferred vinyl ether from the standard point of efficiency, yield of product, and economy is 2-chloroethyl ether.

Theoretically, the reaction between the vinyl ether and petrin requires one mole of vinyl ether for each mole of petrin. Practically, however, it has been found desirable to use a substantial excess of the vinyl ether to ensure complete reaction of the petrin. Thus, from 3 to 5 moles of vinyl ether are employed for each mole of petrin. The molar ratios of vinyl ether to petrin may, therefore, be from 1 to 1 to 5 to 1, with a 3 to 1 ratio being the preferred embodiment.

The amount of mercuric acetate employed as transetherification catalyst is not critical, but there appears to be no advantage in using large excesses. The use of 0.003 to 0.01 mole of mercuric acetate per mole of petrin provides adequate catalysis.

A similar situation obtains in the case of sodium acetate. As set forth hereinbefore, the sodium acetate acts only as a buffer, apparently preventing any acidic products which may be formed from the decomposition of petrin from exerting any unfavorable effects on the course of the reaction. Aside from serving this purpose, the sodium acetate takes no part in the reaction. From about 5% to about 15% of sodium acetate on the weight of the petrin provides adequate buffering.

The reaction is conducted at substantially atmospheric pressure, generally at the reflux temperature of the particular vinyl ether being employed. However, in the case of higher boiling ethers, such as 2-ethylhexyl vinyl ether, the reaction temperature employed should be in the range of 65° to 70° C.

Vinyl petrin ether does not homopolymerize well under the influence of free radical initiators (peroxides or azo-catalysts) usually giving conversions of 20% to 35%. Vinyl petrin ether does, however, polymerize well with certain other monomers under these conditions. Most of the copolymerizations studied to date have involved its copolymerization in solution and bulk with petrin acrylate and acrylyl petrin carbamate but any monomer containing an electron withdrawing group associated with the ethylenic linkage would be capable of entering into a copolymer with vinyl petrin ether. Vinyl petrin ether has been homopolymerized ionically with boron trifluoride etherate to give low molecular weight polymers.

Since poly(vinyl petrin ether) is a hard polymer with low elongation, it is generally plasticized in order to impart the properties required in a propellant grain binder. It can be suitably plasticized by copolymerizing the vinyl petrin ether monomer with acrylic or methacrylic esters which, in themselves, polymerize to soft, rubbery, elastic polymers. Esters of this type can be used to impart desirable properties to the binder composition include methyl acrylate, ethyl acrylate, butyl acrylate, 2-ethylhexyl acrylate and the higher alkyl esters of methacrylic and ethacrylic acids. Esters of this type include the butyl, 2-ethylhexyl, decyl and lauryl esters of methacrylic and ethacrylic acids. The amount of these plasticizing esters used will depend on the other components of the propellant grain and the specific plasticizing monomer used. Generally, however, from 5% to 20% of plasticizing monomer, based on the weight of the vinyl petrin ether, will provide the desired degree of plasticization.

As set forth hereinafter, vinyl petrin ether has proven to be of particular values as a comonomer for use with petrin acrylate.

While suitable physical properties can be obtained by copolymerizing vinyl petrin ether with other alkyl acrylates, the specific impulse developed by the propellant grain is decreased appreciably, particularly if the amount of the acrylate used be an appreciable portion of the grain. Another method of plasticizing poly(vinyl petrin ether), which represents the preferred embodiment, uses nitrato esters of glycols as plasticizers. These nitrato esters are of themselves high energy compounds and so their use causes little reduction in the specific impulse of the grain. A particularly preferred compound of this type is triethylene glycol dinitrate.

The following experimental details set forth methods for solution copolymerizing, bulk copolymerizing and homopolymerizing vinyl petrin ether. The details of typical binder and propellant systems are also set forth.

SOLUTION COPOLYMERIZATIONS

To a small 25 ml. flask was introduced 5.525 grams (0.017 mole) petrin acrylate and 0.891 gram (0.033 mole) vinyl petrin ether (85/15 mole ratio). Ten milliliters of dry acetonitrile containing 0.072 gram dimethyl azoisobutyrate (2 mole percent) was pipetted into the flask. The flask was flushed with pre-purified nitrogen, stoppered and sealed with wax. It was then placed in a 60° C.±1° C. constant temperature bath and allowed to remain for a period of three days. On cooling to room temperature, a residual monomer determination was made on the solution. The conversion was 66%.

A number of different monomer compositions ranging from 90/10 to 75/25 were copolymerized and the conversion determined. The initiator concentrations varied from 1 to 4 mole percent, and the polymerization time from 1.5 to 3 days. The percent conversion increased with initiator concentration, higher ratios of petrin acrylate/vinyl petrin ether and time.

The 90/10 mole ratio petrin acrylate/vinyl petrin ether mixtures had polymerized to the extent of from 51% to 100%; the 85/15 mixtures from 51% to 87%; the 80/20 mixtures from 61% to 87%; and the 75/25 mixtures from 37% to 67%.

The use of benzoyl peroxide gave similar conversions at the higher monomer ratios but somewhat lower conversions as the ratio decreased. Azo-bis-isobutyronitrile was somewhat less effective in promoting the copolymerizations.

BULK COPOLYMERIZATIONS

To a small 25 ml. flask was introduced 5.85 grams (0.018 mole) petrin acrylate, 0.594 gram (0.002 mole) vinyl petrin ether and 0.092 gram (0.0004 mole) dimethyl azoisobutyrate. The flask was flushed with pre-purified nitrogen, stoppered, and sealed with wax. It was then placed in a constant temperature bath at 75°±1° C. The monomers melted and were mixed thoroughly by rotation of the liquid melt for a short time. The polymerization time was three days. The residual monomer analysis was made by dissolving the solid polymer in acetonitrile. A conversion of 79% was found for this particular mixture.

Comonomer mixtures of 90/10, 80/20 and 70/30 petrin acrylate/vinyl petrin ether were studied using 1 to 2 mole percent of dimethylazoisobutyrate for times of one to three days. The percent conversions were: 90/10 (61 to 87%); 80/20 (60 to 77%); and 70/30 (56 to 64%). Again the conversion was greater the higher the initiator concentration, the comonomer ratio and the longer the reaction time.

HOMOPOLYMERIZATION OF VINYL PETRIN ETHER

To a three-necked flask equipped with magnetic stirrer, dropping funnel connected to distillation apparatus and thermometer was introduced 5.0 grams vinyl petrin ether. Methylene chloride (100 ml.) was distilled directly into the flask through the dropping funnel. The solution was cooled to −25° C. in a Dry Ice-acetone bath and 0.5 gram of boron trifluoride etherate in 50 ml. methylene chloride added dropwise to the reaction mixture with vigorous agitation. The reaction temperature varied between −25° C. and −20° C. The polymerization solution was allowed to stand for a period of one and one-half hours after the catalyst had been added. The mixture was then washed with 10% sodium hydroxide solution and then with water. After drying over anhydrous sodium sulfate, the methylene chloride was stripped off leaving an oily residue. Residual monomer analysis on the residue indicated very little monomer remaining 0.09–0.15 meq./gram). The molecular weight was determined ebullioscopically in acetone and found to be 341.

The low molecular weight is due to (a) incomplete removal of low molecular weight materials (water, solvent, monomer) and (b) to the relatively high catalyst concentration used.

BINDER SYSTEMS

The binder systems were made up of the following components: comonomer mixture, plasticizer, cross-linker, and initiator (1 to 3 mole percent). The general technique was to first obtain a liquid melt of all the components followed by casting into molds for curing in ovens heated to 75° to 80° C. Cure times were for as long as six days.

To a three-necked 50 ml. flask fitted with mechanical stirrer and vacuum outlet was introduced 8.775 grams (0.027 mole) of petrin acrylate monomer, 0.981 gram (0.003 mole) of vinyl petrin ether monomer, 4.16 grams triethylene glycol dinitrate (30% by weight) and 0.2 gram PE–920 as cross-linking agent. PE–920 is the grade designation employed by Plaskon, a division of Allied Chemical, and is a 50% solution of a maleic anhydride-propylene glycol polyesters in diallyl phthalate. The flask was introduced into a bath at 80° C. and a liquid melt obtained within a short time with good agitation. Benzoyl peroxide, 0.0726 gram (1 mole percent), was added in the form of an ether solution. A vacuum was applied to the system for a period of 3 to 5 minutes after which the liquid melt was cast into Teflon-coated molds for curing. The polymerization was effected in an 80° C. oven during a period of four days. Residual monomer analysis of the resulting polymer indicated 94% conversion. The polymer had a tough rubber-like character.

Comonomer mixtures ranging from 90/10 to 50/50 were examined in binder systems. The extent of polymerization of the various mixtures varied from 78% to 98% depending upon the comonomer ratio, the initiator concentration and time. Results reported as mole percent ratio petrin acrylate/vinyl petrin ether; percent conversion; and time in days: 90/10, 95–98%, 4; 85/15, 95–98%, 4; 80/20, 94–96%, 4; 75/25, 92–95%, 4; 70/30, 88–94%, 4; 60/40, 81–91%, 6; and 50/50, 78–85%, 6.

The above conversions represent the minimum and maximum obtained under the described reaction conditions. In general, the polymers changed from firm plastic materials to materials which had little dimension stability at room temperature as the ratio of petrin acrylate/vinyl petrin ether decreased. Divinyl benzene and triethylene glycol diacrylate were more effective toward increasing the dimensional stability of the binder systems when used as substitutes for PE–920.

PROPELLANT SYSTEMS

In general, the experimental technique of forming propellant systems was identical with that described for the binder systems with the exception that an oxidizing agent, ammonium perchlorate, was added to the monomer melt and blended thoroughly prior to the addition of the initiator solution.

To a one-liter stainless steel mixing vessel, equipped with glass top, fitted with mechanical stirrer and vacuum outlet, was added 43.95 grams petrin acrylate monomer, 4.43 grams vinyl petrin ether monomer, 20.70 grams triethylene glycol dinitrate and 0.77 gram triethylene glycol dimethacrylate. The mixing vessel was placed in an 80° C. water bath to obtain the liquid melt. Then 84.50 grams ammonium perchlorate (35µ) was added and the mixture thoroughly blended following by the addition of 0.35 gram benzoyl peroxide. The system was evacuated for approximately five minutes, then cast into Teflon-coated molds. Curing of the mixture was carried out in an 80° C. oven over a period of four days. This propellant composition had a rubber-like character, possessing good dimensional stability and flexibility.

The other compositions in this series were prepared in a similar manner. Compositions containing 2 and 3 mole percent cross-linker were prepared using comonomer mixtures of from 90/10 to 50/50 mole percent petrin acrylate/vinyl petrin ether. However, not all the final products were acceptable for physical property measurements, this being due to the character of the compositions in that they were bonded so well to the molds that they were torn apart in attempts to effect their removal. The physical property data is given below for those compositions which were acceptable.

PHYSICAL PROPERTIES OF PETRIN ACRYLATE/VINYL PETRIN ETHER PROPELLANT COMPOSITIONS

| Monomer ratio mole percent PA/VPE [1] | Mole percent cross-linker, percent | Tensile | | | Elongation | | | Specific gravity |
|---|---|---|---|---|---|---|---|---|
| | | −40° F. | 75° F. | 135° F. | −40° F. | 75° F. | 135° F. | |
| Standard | 2 | 1,276 | 48 | 35 | 14 | 40 | 39 | 1.71 |
| 90/10 | 2 | 511 | 27 | 17 | 9 | 73 | 64 | 1.70 |
| 80/20 | 2 | 522 | 13 | 7.7 | 10 | 128 | 100 | 1.65 |
| Standard | 3 | 938 | 55 | 40 | 12 | 37 | 30 | 1.71 |
| 90/10 | 3 | 333 | 33 | 23 | 8 | 52 | 49 | 1.70 |
| 80/20 | 3 | 711 | 23 | 15 | 12 | 81 | 70 | 1.69 |
| 70/30 | 3 | 626 | 13 | 7.5 | 10 | 142 | 94 | 1.69 |

[1] PA=petrin acrylate, VPE=vinyl petrin ether.

From the above measurements, it may be seen that the introduction of vinyl petrin ether into a propellant composition as a comonomer with petrin arcylate increases significantly the elongation while reducing the tensile strength. Also, although not apparent, the introduction of vinyl petrin ether increases the bonding properties of the compositions and is thought to lower the second-order transition temperature. The lowering of the second-order transition temperature has been studied for the propellant systems but no comparison is presently available with a standard petrin acrylate composition. These compositions were made as previously described with divinylbenzene as cross-linker (1%) and triethylene glycol dinitrate as plasticizer (30%). The glass temperatures are reported below and compared with a corresponding binder system containing only petrin acrylate.

System: Tg (° C.)
 Petrin acrylate (binder system only) _____ −30
 90/10 petrin acrylate/vinyl petrin ether _____ −17
 85/15 petrin acrylate/vinyl petrin ether _____ −20
 80/20 petrin acrylate/vinyl petrin ether _____ −29
 75/25 petrin acrylate/vinyl petrin ether _____ −32

It appears then that the general trend is to lower the second-order transition temperature with increased amounts of vinyl petrin ether.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise stated.

Example I

To a one-liter three-necked flask equipped with magnetic stirrer, reflux condenser and thermometer was introduced 159.75 grams (1.5 moles) vinyl-2-chloroethyl ether, 139.5 grams (0.5 mole) petrin, 10.0 grams (0.003 mole) mercuric acetate and 10.0 grams sodium acetate. The reaction mixture was heated to 60° to 65° C. with continued stirring for a period of twenty-four hours. On cooling to room temperature, a mixture of 32.0 grams (1.0 mole) absolute methanol containing an additional 10.0 grams mercuric acetate and 10.0 grams sodium acetate was added slowly. The reaction continued at room temperature for a period of six hours during which time the methyl vinyl ether distilled from the reaction mixture and was collected in a trap cooled in a Dry Ice-actone bath. A total of 47.26 grams was collected in this manner. The reaction mixture was then diluted with 100 ml. of methylene chloride, washed first with 10% sodium hydroxide, then with water, and finally dried over anhydrous sodium sulfate. The dry methylene chloride solution was chromatographed over silica gel using methylene chloride as solvent. Removal of the solvent from the effluent fractions gave 73.67 grams vinyl petrin ether, M.P. 58° to 62° C. The product was recrystallized from ethanol (norit treatment), dried thoroughly and rechromatographed over silica gel. After a second recrystallization from ethanol, the vinyl petrin ether melted at 64° to 65° C. A yield of 67.23 grams (45.2%) was obtained as a white crystalline solid.

*Analysis.*—Calculated for $C_7H_{11}N_3O_{10}$: C, 28.28; H, 3.70; N, 14.14. Found: C, 27.87; H, 3.66; N, 13.17.

Various modifications in the experimental conditions for carrying out the above transetherification reaction have not resulted in improving the yield of vinyl petrin ether. Also extraction techniques employed in the isolation of the product were not satisfactory as a substitute for the method of isolating the product given above. The addition of methanol with catalyst during the latter part of the reaction proved beneficial in removing a major portion of the excess 2-chloroethylvinyl ether and thus made the isolation of the product from the reaction mixture easier. The use of sodium acetate as an acid scavenger increased the yield by 15% to 20%, this probably being due to the elimination from the reaction mixture of acidic materials arising from the decomposition of petrin over extended periods at relatively high temperatures. These acidic materials react with the catalyst causing it to lose its effectiveness in promoting the reaction.

The physical properties of this interesting high energy monomer are presented below:

Structure:

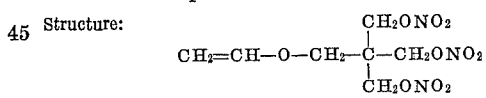

Formula: $C_7H_{11}N_3O_{10}$
Melting point: 64–65° C.
Oxygen balance: −32.3 (½ CO, ½ $CO_2$, $H_2O$)
Impact sensitivity: 20.8″ 50% fire level with 1 kg. wt.
Heat of explosion: 855 cal./g.
Heat of combustion: 2982 cal./g.
Taliani: $m_{100}=0.50$; $t_{100}=5½$ hours.

Example II

To a 200 ml. three-necked flask fitted with magnetic stirrer, reflux condenser and thermometer was introduced 2.0 g. sodium acetate, 2.0 mercuric acetate, 14.4 g. (0.2 mole) ethyl vinyl ether and 27.1 g. (0.1 mole) petrin. The reaction mixture was then heated to reflux and maintained for a period of approximately twenty-four hours. The reaction mixture was worked up as in Example I with the exception that the excess ethyl vinyl ether was allowed to evaporate from the mixture. Yield 4.3 g. (14.4%), M.P. 64–65° C.

Example III

To a 200 ml. three-necked flask fitted with magnetic stirrer, reflux condenser and thermometer was introduced 2.0 g. of sodium acetate, 2.0 g. mercuric acetate, 40.0 g. (0.4 mole) butyl vinyl ether and 27.1 g. (0.1 mole) petrin. The reaction mixture was maintained at reflux for a period of eighteen hours. Vinyl petrin ether was isolated as in Example I. Yield 7.6 g. (25.5%), M.P. 64–65° C.

Example IV

The use of 2-ethylhexyl vinyl ether, 46.8 g. (0.3 mole) in a reaction similar to Example III for a period of twenty hours at 80–85° C. gave 5.23 g. (17.6%) vinyl ether, M.P. 64–65° C.

The polymers and copolymers of vinyl petrin ether offer many advantages for use as components of solid propellant grains. Because the polymers and copolymers are hard solids with relatively low elongation, they can be plasticized over a wide range to provide a wide range of physical properties. As set forth hereinbefore, they can be plasticized by copolymerization with a variety of ethylenically unsaturated monomers which monomers form soft polymers such as the alkyl acrylates. They may also be plasticized with nitrato esters of glycols to give tough grains with high energy content.

The adhesion of vinyl petrin ether copolymers to metal surfaces is high, and vinyl petrin ether may be used in a copolymer with another monomer, such as petrin acrylate, to improve the adhesion of the propellant grain to the sides of the molding or casing into which it is cast before polymerization. As is well known to those skilled in the art, high adhesion of the grain to the casing is a prime requisite for good control of the burning characteristics of the grain.

I claim:

1. A compound selected from the group consisting of vinyl trinitratopentaerythrityl ether, poly(vinyl trinitratopentaerythrityl ether) and copolymers of vinyl trinitratopentaerythrityl ether with a monomer selected from the group consisting of trinitratopentaerythrityl acrylate and alkyl acrylates.
2. Vinyl trinitratopentaerythrityl ether.
3. Polymers of vinyl trinitratopentaerythrityl ether.
4. Poly(vinyl trinitratopentaerythrityl ether).
5. A copolymer of vinyl trinitratopentaerythrityl ether and trinitratopentaerythrityl acrylate.
6. A copolymer of vinyl trinitratopentaerythrityl ether and an alkyl acrylate.
7. A process for the preparation of vinyl trinitratopentaerythrityl ether which comprises reacting trinitratopentaerythritol with a vinyl ether selected from the group consisting of alkyl vinyl ethers and monohaloalkyl vinyl ethers, mercuric acetate being present in the reaction mixture as an esterification catalyst, and recovering the vinyl trinitratopentaerythrityl ether so formed.
8. A process for the preparation of vinyl trinitratopentaerythrityl ether which comprises reacting trinitratopentaerythritol with a vinyl ether selected from the group consisting of alkyl vinyl ethers and monohaloalkyl vinyl ethers, sodium acetate being present in the reaction mixture, and recovering the vinyl trinitratopentaerythrityl ether so formed.
9. A process for the preparation of vinyl trinitratopentaerythrityl ether which comprises reacting trinitratopentaerythritol with a vinyl ether selected from the group consisting of alkyl vinyl ethers and monohaloalkyl vinyl ethers and recovering the vinyl trinitratopentaerythrityl ether so formed.
10. A process for the preparation of vinyl trinitratopentaerythrityl ether which comprises reacting, at the reflux temperature of the vinyl ether, trinitratopentaerythritol and 2-chloroethyl vinyl ether, the molar ratio of trinitratopentaerythritol to said vinyl ether being from 1 to 1 to about 1 to 5, there being present mercuric acetate at as transesterification catalyst and sodium acetate as a buffer, and recovering the vinyl trinitratopentaerythrityl ether from the reaction mixture.
11. The process for the preparation of vinyl trinitratopentaerythrityl ether which comprises reacting, at the reflux temperature of the vinyl ether, trinitratopentaerthritol and 2-chloroethyl vinyl ether, the molar ratio of trinitratopentaerythritol to said 2-chloroethyl vinyl ether being 1 to 3, there being present mercuric acetate as a transesterification catalyst and sodium acetate as a buffer, and recovering the vinyl trinitratopentaerythrityl ether from the reaction mixture.

References Cited

UNITED STATES PATENTS

| | | | |
|---|---|---|---|
| 2,760,990 | 8/1956 | Watanabe et al. | 260—614 |
| 2,724,728 | 11/1955 | Kennedy | 260—614 |
| 2,784,175 | 3/1957 | Kell et al. | 260—91.1 |
| 2,477,218 | 7/1949 | Theron | 260—91.1 |
| 2,720,511 | 10/1955 | Cupery et al. | 260—86.1 |
| 2,845,407 | 7/1958 | Watanabe et al. | 260—86.1 |
| 2,479,470 | 8/1949 | Carr | 52—0.5 |
| 2,857,258 | 10/1958 | Thomas | 52—0.5 |

LELAND A. SEBASTIAN, *Primary Examiner.*

U.S. Cl. X.R.

149—19, 20, 76, 88; 260—91.1, 467